US012598543B2

(12) United States Patent
    Rajendran

(10) Patent No.: US 12,598,543 B2
(45) Date of Patent: Apr. 7, 2026

(54) SYSTEMS AND METHODS FOR RETRIEVING RAN INFORMATION

(71) Applicant: Radisys India Private Limited, Bangalore (IN)

(72) Inventor: Geetha Priya Rajendran, Bengaluru (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 338 days.

(21) Appl. No.: 18/246,687

(22) PCT Filed: Sep. 16, 2022

(86) PCT No.: PCT/IB2022/058765
    § 371 (c)(1),
    (2) Date: Mar. 27, 2023

(87) PCT Pub. No.: WO2023/042141
    PCT Pub. Date: Mar. 23, 2023

(65) Prior Publication Data
    US 2023/0370959 A1      Nov. 16, 2023

(30) Foreign Application Priority Data
    Sep. 17, 2021   (IN) ............................ 202141042043

(51) Int. Cl.
    *H04W 48/16*        (2009.01)
    *H04W 48/08*        (2009.01)
(52) U.S. Cl.
    CPC ........... *H04W 48/16* (2013.01); *H04W 48/08* (2013.01)
(58) Field of Classification Search
    CPC ....... H04W 4/50; H04W 28/02; H04W 28/04; H04W 28/08; H04W 28/025;
    (Continued)

(56) References Cited

U.S. PATENT DOCUMENTS 9,060,299 B2    6/2015  Morad et al.
2020/0015194 A1  1/2020  Li et al.
                (Continued)

FOREIGN PATENT DOCUMENTS

CN      107231623 B     11/2020
CN      114727333 A  *  7/2022   ........ H04W 28/0221
                (Continued)

OTHER PUBLICATIONS

O-RAN.WG3.E2GAP-v01.01 (Year: 2020).*
International Search Report from International Appl. No. PCT/IB2022/058765, mailed Nov. 29, 2022.

*Primary Examiner* — Wesley L Kim
(74) *Attorney, Agent, or Firm* — FINNEGAN, HENDERSON FARABOW, GARRETT & DUNNER, LLP

(57)         ABSTRACT

Present disclosure generally relates to wireless telecommunication networks, and more particularly relates to systems and methods for retrieving Radio Access Network (RAN) information over E2 interface of Open Radio Access Network (O-RAN), using information request response procedure. System determines, if Radio Access Network (RAN) information is required by Near-RT RIC, based on occurrence of non-subscription-based O-RAN use case scenarios or deployment scenarios in Near-RT RIC. Further, system builds E2 Service Model (E2SM) container with required type of information, when RAN information is required. Furthermore, system encodes built E2SM container in E2 Application Protocol (E2AP) message. Thereafter, system transmits E2AP message as RAN information request to E2 node via E2 interface associated with O-RAN. Additionally, system receives RAN information response corresponding to RAN information request, from E2 node. The RAN information response is transmitted by E2 node as E2AP
(Continued)

response message by encoding E2SM container with requested RAN information.

13 Claims, 9 Drawing Sheets

(58) Field of Classification Search
CPC . H04W 28/0236; H04W 48/16; H04W 24/02; H04W 24/10; H04W 48/08; H04W 88/085; H04W 88/12; H04W 92/12
See application file for complete search history.

(56) References Cited

U.S. PATENT DOCUMENTS

| | | | |
|---|---|---|---|
| 2020/0022083 A1 | 1/2020 | Jin et al. | |
| 2021/0014912 A1 | 1/2021 | Song et al. | |
| 2021/0051490 A1* | 2/2021 | Yanover ................ | H04W 24/02 |
| 2022/0225264 A1 | 7/2022 | Song et al. | |
| 2022/0287038 A1* | 9/2022 | Singh .................... | H04W 28/06 |
| 2023/0055590 A1* | 2/2023 | Sivaraj ................. | H04W 28/02 |
| 2023/0239776 A1* | 7/2023 | Song .................... | H04W 48/18 |
| | | | 370/329 |
| 2023/0262638 A1* | 8/2023 | Song .................... | H04W 88/12 |
| | | | 370/328 |

FOREIGN PATENT DOCUMENTS

| | | | | |
|---|---|---|---|---|
| CN | 114095367 B | * | 5/2023 | ......... H04L 41/0803 |
| RU | 2538766 C2 | | 1/2015 | |
| WO | 2021066587 A1 | | 4/2021 | |
| WO | WO-2022015008 A1 | * | 1/2022 | .......... H04W 36/322 |

* cited by examiner

400

SYSTEMS AND METHODS FOR RETRIEVING RAN INFORMATION

FIELD OF INVENTION

The embodiments of the present disclosure generally relate to wireless telecommunication networks. More particularly, the present disclosure relates to systems and methods for retrieving Radio Access Network (RAN) information over E2 interface of an Open Radio Access Network (O-RAN), using an information request response procedure.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, an Open Radio Access Network (O-RAN) may enable network operators and network vendors to work seamlessly with different Radio Access Network (RAN) systems. The O-RAN may help in achieving interoperability across systems from different vendors in an operator network. In O-RAN systems, only subscription-based communication may be supported over an E2 interface. With this method of communication instant/immediate retrieval of information is not possible. Information may be retrieved only when an event provided in the subscription is triggered. Another issue with this communication method is that, once the subscription is received, then information is sent periodically as and when the event is triggered. One time retrieval of information may not be facilitated. There are O-RAN-specific needs to address data synchronization issues, and delayed onboarding of xAPPs rapidly varying RAN data. The subscription-based communication method does not address these O-RAN use cases.

Specifically, there may be issues faced in communication between two O-RAN systems and Near-Real Time RAN Intelligent Controller (Near-RTRIC) and E2 node. For instance, consider a scenario of data inconsistency. The data mirroring between Near-RT RIC and E2 node may be needed for Near-RT RIC to execute real-time operations on E2 Node (Data includes cell context and User Equipment (UE) context). However, there may be conditions under which the data synchronization may be lost between Near-RT RIC and E2 node. When a xAPPs sub-system within the Near-RT RIC has detected a data mismatch, the xAPPs may prefer to retrieve the current snapshot of data available at E2 Node. The xAPPs may need a one-time instantaneous retrieval of information from E2 Node. However, this cannot be achieved via the existing subscription-based communication method between the E2 node and Near-RT RIC. In another scenario delayed onboarding of xAPPs, consider the xAPPs sub-system within the Near-RT RIC needs data from E2 Node to perform any operation. If an xAPPs may be onboarded into Near-RT RIC later (sometime after Near-RT RIC and E2 node start-up), then xAPPs may have missed the periodical data or history of information from E2 Node. In such scenarios, xAPPs may prefer to first retrieve the current snapshot of information available at E2 node and then proceed for subscription-based periodical updates. However, the subscription-based communication mechanism may not work for the initial one-time retrieval of all the information available at E2 Node. In yet another scenario of rapidly varying RAN data, consider there may be certain data in the E2 node, which may change very rapidly within a short period. For such data sets, periodical data mirroring upon any change in data may be cumbersome. Also, there may be a high probability that periodical update is lost and eventually, data is not synchronized between Near-RT RIC and E2 node. For such datasets, a subscription-based communication mechanism may not work.

Therefore, a subscription-based communication mechanism does not work for the aforementioned scenarios. The E2 interface currently may not provide any method to fetch information from the E2 node system instantaneously without any subscription by Near-RT RIC. Hence, there is a need for an information request response procedure to retrieve Radio Access Network (RAN) information over the E2 interface of an Open Radio Access Network (O-RAN). Therefore, there is a need in the art to provide systems and methods that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide efficient, improved, and instantaneous systems and methods for retrieving Radio Access Network (RAN) information over an E2 interface of an Open Radio Access Network (O-RAN), using an information request response procedure.

Another object of the present disclosure is to address issues faced in communication between two O-RAN systems—Near-RT RIC and E2 Node.

Another object of the present disclosure is to address use cases where subscription-based communication does not work and a one-time instantaneous fetch of information is needed.

Another object of the present disclosure is to provide systems and methods for retrieving data to perform a one-time fetch of the complete data when any operation needs to be performed on the data.

Another object of the present disclosure is to imply to both Near-RT RIC and E2 node that instant information is needed and may be immediately sent by E2 Node.

Another object of the present disclosure is to eliminate any event triggers or periodic reporting of information, unlike RIC subscription which is the preferred communication mechanism for use cases such as data inconsistency, late onboarding of xAPPs, and rapidly varying RAN data. Once the information is sent by E2 Node, the procedure is complete. Information is carried as transparent containers over the E2 interface.

Another object of the present disclosure is to invoke the information request/response procedure via the Near-RT RIC to retrieve the complete snapshot of RAN data (e.g., UE context and cell context) available in E2 Node. Once the RAN data is sent by E2 Node, Near-RT RIC may use the available RAN data and resolve the data inconsistency. Near-RT RIC may then use the periodical data reporting from E2 Node due to RIC subscription to maintain the data synchronization.

Another object of the present disclosure is to retrieve via the xAPPs a complete snapshot of information by invoking the information request/response procedure and then subscribing to a periodical update of RAN data.

Another object of the present disclosure is to avoid using the existing subscription-based mechanism for information retrieval. The present disclosure has information request and response procedures without event triggers or periodic reporting of information.

Another object of the present disclosure is to provide systems and methods for retrieving information in a faster mechanism using a two-way handshake (request/response) message.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for retrieving Radio Access Network (RAN) information over an E2 interface in an Open Radio Access Network (O-RAN), using an information request response procedure. The system determines, if Radio Access Network (RAN) information is required by the Near-RT RIC, based on an occurrence of at least one of the non-subscription-based O-RAN use case scenarios and deployment scenarios in the Near-RT RIC. Further, the system builds an E2 Service Model (E2SM) container with a required type of information, when the RAN information is required. Furthermore, the system encodes the built E2SM container in an E2 Application Protocol (E2AP) message. Thereafter, the system transmits the E2AP message as a RAN information request to an E2 node via an E2 interface associated with the O-RAN. The RAN information request includes the E2SM container with the required type of information. Additionally, the system receives a RAN information response corresponding to the RAN information request, from the E2 node. The RAN information response is transmitted by the E2 node as an E2AP response message by encoding an E2SM container with a requested RAN information.

In another aspect, the present disclosure provides a method for retrieving Radio Access Network (RAN) information over an E2 interface in an Open Radio Access Network (O-RAN), using an information request response procedure. The method includes determining, if Radio Access Network (RAN) information is required by the Near-RT RIC, based on an occurrence of at least one of the non-subscription-based O-RAN use case scenarios and deployment scenarios in the Near-RT RIC. Further, the method includes building an E2 Service Model (E2SM) container with a required type of information, when the RAN information is required. Furthermore, the method includes encoding the built E2SM container in an E2 Application Protocol (E2AP) message. Additionally, the method includes transmitting the E2AP message as a RAN information request to an E2 node via an E2 interface associated with the O-RAN. The RAN information request includes the E2SM container with the required type of information. Further, the method includes receiving a RAN information response corresponding to the RAN information request, from the E2 node. The RAN information response is transmitted by the E2 node as an E2AP response message by encoding an E2SM container with a requested RAN information.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components, or circuitry commonly used to implement such components.

Figure 1:
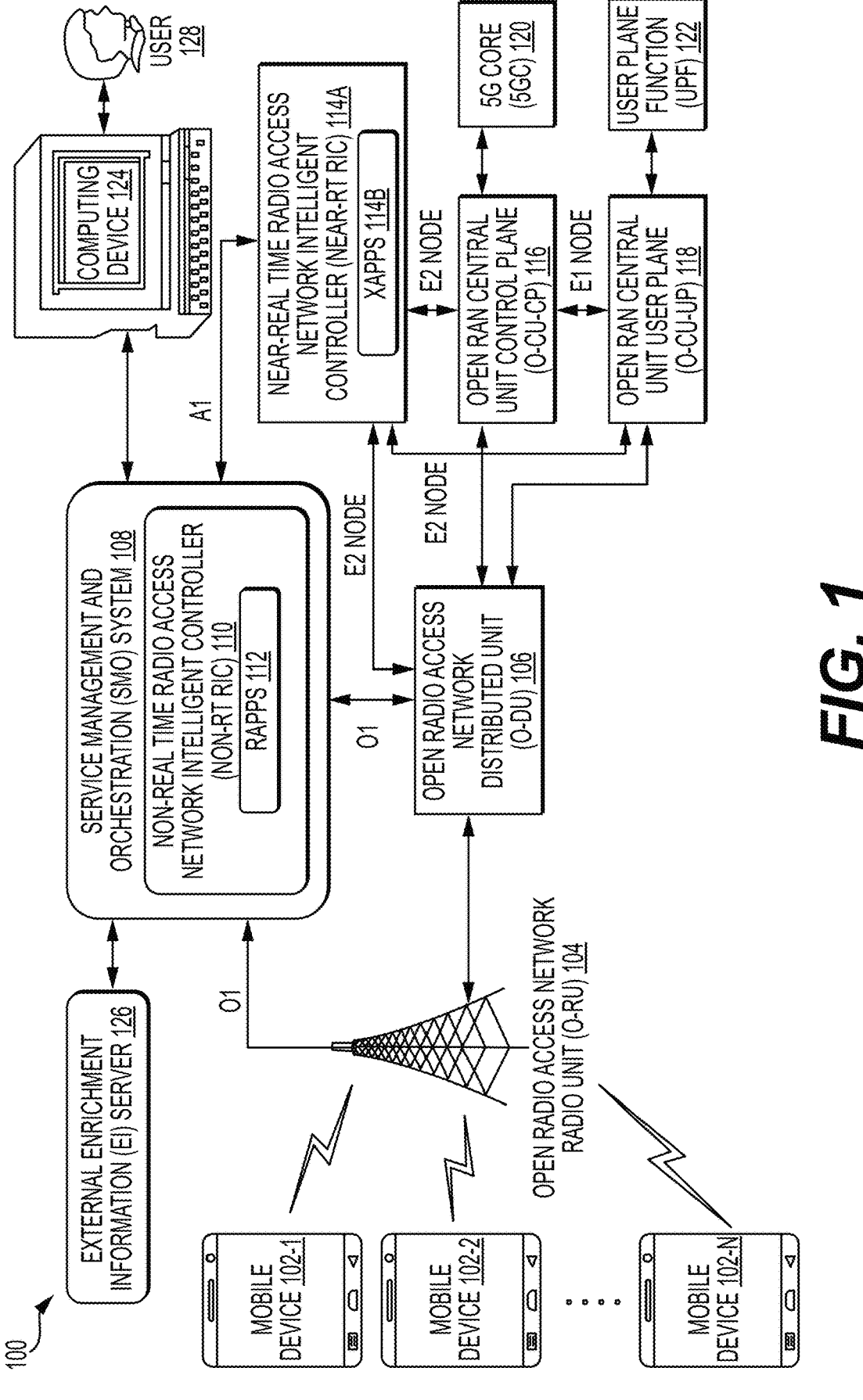
FIG. 1 illustrates an exemplary network architecture in which or with which proposed system of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above.

Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Various embodiments of the present disclosure provide an efficient, improved, and instantaneous systems and methods for retrieving Radio Access Network (RAN) information over the E2 interface of an Open Radio Access Network (O-RAN), using an information request response procedure. The present disclosure addresses issues faced in communication between two O-RAN systems—Near-RT RIC and E2 Node. The present disclosure addresses use cases where subscription-based communication does not work and a one-time instantaneous fetch of information is needed. The present disclosure provides systems and methods for retrieving data to perform a one-time fetch of the complete data when any operation needs to be performed on the data. The present disclosure implies to both Near-RT RIC and E2 node that instant information is needed and may be immediately sent by E2 Node. The present disclosure eliminates any event triggers or periodic reporting of information, unlike RIC subscription which is a preferred communication mechanism for use cases such as data inconsistency, late onboarding of xAPPs, and rapidly varying RAN data. Once the information is sent by E2 Node, the procedure is complete. Information is carried as transparent containers over the E2 interface.

The present disclosure invokes the information request/response procedure via the Near-RT RIC to retrieve the complete snapshot of RAN data (e.g., UE context and cell context) available in the E2 Node. Once the RAN data is sent by E2 Node, Near-RT RIC may use the available RAN data and resolve the data inconsistency. Near-RT RIC may then use the periodical data reporting from E2 Node due to RIC subscription to maintain the data synchronization. The present disclosure retrieves from the E2 node, a complete snapshot of information by invoking the information request/response procedure and then subscribes to a periodical update of RAN data. The present disclosure avoids using the existing subscription-based mechanism for information retrieval. The present disclosure has information request and response procedures without event triggers or periodic reporting of information. The present disclosure provides systems and methods for retrieving information in a faster mechanism using a two-way handshake (request/response) message.

Referring to FIG. 1 that illustrates an exemplary network architecture for a Radio Access Network (RAN) information retrieving system (100) (also referred to as network architecture (100) or system (100)) in which or with which a Service Management and Orchestration (SMO) system (108) or simply referred to as the SMO system (108) of the present disclosure can be implemented, in accordance with an embodiment of the present disclosure. As illustrated, the exemplary network architecture (100) may be equipped with a Non-Real Time Radio access network Intelligent Controller (Non-RT RIC) (110) associated with the SMO system (108), and a Near-Real Time Radio access network Intelligent Controller (Near-RT RIC) (114A) communicatively coupled to the SMO system (108) for establishing communication and instant/near-real-time retrieval of Radio Access Network (RAN) information over an E2 interface of an Open Radio Access Network (O-RAN), based on schemes received from one or more users (128-1, 128-2, 128-3 . . . 128-N) (individually referred to as the user (128) and collectively referred to as the users (128)) associated with one or more first computing devices (124-1, 124-2 . . . 124-N) (individually referred to as the computing device (124) and collectively referred to as the computing devices (124)). The SMO system (108) may be further operatively coupled to mobile devices (102-1, 102-2, . . . , 102-N) (individually referred to as the mobile device (102) and collectively referred to as mobile devices (102)), via an Open radio access network Radio Unit (O-RU) (104). The O-RU (104) may facilitate network communication to one or more mobile devices (102-1, 102-2, . . . , 102-N) (individually referred to as the mobile device (102) and collectively referred to as mobile devices (102)). The SMO system (108) may further be communicatively coupled to the one or more first computing devices (124).

Further, the Non-RT RIC (110) may include one or more rAPPs (112) and the Near-RT RIC (114A) may include one or more xAPPs (114B). The SMO system (108) and the Near-RT RIC (114A) may be coupled to an Open radio access network Distributed Unit (O-DU) (106). The O-DU (106) may be coupled to an Open radio access network Central Unit Control Plane (O-CU-CP) (116) and an Open radio access network Central Unit User Plane (O-CU-UP) (118). The Near-RT RIC (114A) may also be coupled to the O-CU-CP (116) and the O-CU-UP (118). The O-CU-CP (116) may be coupled to the O-CU-UP (118). Further, the O-CU-CP (116) may be coupled to a Fifth-Generation (5G) Core (5GC) (120) and the O-CU-UP (118) may be coupled to a User Plane Function (UPF) (122).

In an embodiment, the xAPPs (114B) may instruct, or trigger one or more E2 nodes as shown in FIG. 1, to start action to report any data or perform any control action periodically. The E2 nodes may transmit data to the SMO system (108) via an O1 interface. Further, the E2 nodes may also transmit reports to the xAPPs (114B). In an embodiment, the xAPPs (114B) may collect reports from the E2 nodes and may transmit policy feedback to the rAPPs (112) via an A1 interface.

Further, the network architecture (100) may include an external Enrichment Information (EI) server (126).

In an embodiment, Machine Learning (ML) modules (not shown in FIG. 1) may work on a set of instructions in the SMO system (108) to facilitate instant communication without a subscription. The ML modules may transmit feedback to the rAPPs (112). Further, the rAPPs (112) may transmit commands to the SMO system (108).

In an embodiment, communication between O-RAN sub-sub systems/modules, the Near-RT RIC (114A), and the E2 Node may take place through an E2 interface. The E2 interface currently does not provide any method to instantaneously fetch information from the E2 Node without any subscription by the Near-RT RIC (114A).

In an embodiment, the Near-RT RIC (114A) may determine, if Radio Access Network (RAN) information is required by the Near-RT RIC (114A), based on an occurrence of at least one of non-subscription-based O-RAN use case scenarios and deployment scenarios in the Near-RT RIC (114A). In an embodiment, the non-subscription-based O-RAN use case scenarios and deployment scenarios include, but are not limited to, a data inconsistency use case scenario, a late onboarding of the one or more xAPPs deployment scenario, a rapidly varying RAN information use case scenario, and the like. In an embodiment, for determining, if Radio Access Network (RAN) information is required by the Near-RT RIC (114A), the Near-RT RIC (114A) may identify at least one of a non-synchronization of the RAN information between the E2 node and the one or more xAPPs (114B), a non-reception of periodical updates corresponding to the RAN information from the E2 node, and a rapid variation in the at least one of retrieved RAN information and reported RAN information within a short period.

In an embodiment, the Near-RT RIC (114A) may build an E2 Service Model (E2SM) container with a required type of information, when the RAN information is required.

In an embodiment, the Near-RT RIC (114A) may encode the built E2SM container in an E2 Application Protocol (E2AP) message.

In an embodiment, the Near-RT RIC (114A) may transmit the E2AP message as a RAN information request to an E2 node via an E2 interface associated with the O-RAN. In an embodiment, the RAN information request includes the E2SM container with the required type of information. In an embodiment, upon receiving the RAN information request by the E2 node, the E2 node may decode the E2AP message and determine the E2SM container. Further, the E2 node may decode the E2SM container to analyse the information requested. Furthermore, the E2 node may encode an E2SM container with the requested information within an E2AP message. Additionally, the E2 node may transmit the E2AP message as the RAN information response, to the Near-RT RIC (114A).

In an embodiment, the Near-RT RIC (114A) may receive a RAN information response corresponding to the RAN information request, from the E2 node, wherein the RAN information response is transmitted by the E2 node as an E2AP response message by encoding an E2SM container with a requested RAN information.

In an embodiment, for the data inconsistency use case scenario, the Near-RT RIC (114A) may establish a RIC subscription-based communication with the E2 node, for retrieving RAN information. Further, the Near-RT RIC (114A) may retrieve periodically, the RAN information through the RIC indication from the E2 node. Furthermore, the Near-RT RIC (114A) may identify periodically, the non-synchronization of the RAN information between the E2 node and the one or more xAPPs (114B). In an embodiment, the Near-RT RIC (114A) may transmit an E2AP message as a RAN information request to the E2 node, when the non-synchronization of the RAN information between the E2 node and the one or more xAPPs (114B) is identified. In an embodiment, the RAN information request includes the E2SM container with the required type of information. Further, the Near-RT RIC (114A) may receive a RAN information response corresponding to the RAN information request, from the E2 node. In an embodiment, the RAN information response is transmitted by the E2 node as an E2AP response message by encoding an E2SM container with a requested RAN information. In an embodiment, upon receiving the RAN information from the E2 Node, the Near-RT RIC (114A) executes the Near-RT RIC (114A) to resolve the data inconsistency use case scenario.

In an embodiment, for the late onboarding of the one or more xAPPs deployment scenario, the Near-RT RIC (114A) may identify a delay in the onboarding of the one or more xAPPs (114B), by determining a lapse of pre-defined time for onboarding after start-up of the Near-RT RIC (114A). Further, the Near-RT RIC (114A) may determine, if historical RAN information is required by the one or more xAPPs (114B). Furthermore, the Near-RT RIC (114A) may transmit an E2AP message as a RAN information request to the E2 node, when the historical RAN information is required. The RAN information request includes the E2SM container with the required type of information. Additionally, the Near-RT RIC (114A) may receive a RAN information response corresponding to the RAN information request, from the E2 node. The RAN information response is transmitted by the E2 node as an E2AP response message by encoding an E2SM container with a requested RAN information.

In an embodiment, for the rapidly varying RAN information use case scenario, the Near-RT RIC (114A) may determine periodically, the at least one of retrieved RAN information and reported RAN information has a rapid variation within a short period, compared to previously retrieved RAN information and reported RAN information, respectively. Furthermore, the Near-RT RIC (114A) may determine, if a complete RAN information is required by the Near-RT RIC (114A), when the at least one of retrieved RAN information and reported RAN information has rapid variation within the short period. Additionally, the Near-RT RIC (114A) may transmit an E2AP message or a RAN information request to the E2 node, when the complete RAN information is required. The RAN information request includes the E2SM container with the required type of information. Further, the Near-RT RIC (114A) may receive a RAN information response corresponding to the RAN information request, from the E2 node. The RAN information response is transmitted by the E2 node as an E2AP response message by encoding an E2SM container with a requested RAN information.

In an embodiment, the Near-RT RIC (114A) may be a System on Chip (SoC) system but not limited to the like. In another embodiment, an onsite data capture, storage, matching, processing, decision-making, and actuation logic may be coded using Micro-Services Architecture (MSA) but not limited to it. A plurality of microservices may be containerized and may be event-based in order to support portability.

In an embodiment, the network architecture (100) may be modular and flexible to accommodate any kind of changes in the SMO system (108), and the Near-RT RIC (114A) as proximate processing may be acquired toward retrieving Radio Access Network (RAN) information over E2 interface of an Open Radio Access Network (O-RAN), using information request response procedure. The SMO system (108), and the Near-RT RIC (114A) configuration details can be modified on the fly.

In an embodiment, the SMO system (108)/Near-RT RIC (114A) may be remotely monitored and the data, application, and physical security of the SMO system (108)/Near-RT RIC (114A) may be fully ensured. In an embodiment, the data may get collected meticulously and deposited in a cloud-based data lake to be processed to extract actionable insights. Therefore, the aspect of predictive maintenance can be accomplished.

In an exemplary embodiment, a communication network (not shown in FIG. 1) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, a server (not shown in FIG. 1) may be included in architecture (100). The Near-RT RIC (114A) and the SMO system (108) may be implemented on the server. The server may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more computing devices (124), and the one or more mobile devices (102) may communicate with the SMO system (108)/Near-RT RIC (114A) via a set of executable instructions residing on any operating system, including but not limited to, Android™, iOS™, Kai OS™ and the like. In an embodiment, one or more computing devices (124) and the one or more mobile devices (102) may include, but are not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device (124) may include one or more in-built or externally coupled accessories including, but not limited to, a visual aid device such as camera, audio aid, a microphone, a keyboard, input devices for receiving input from a user such as a touchpad, touch-enabled screen, electronic pen, receiving devices for receiving any audio or visual signal in any range of frequencies and transmitting devices that can transmit any audio or visual signal in any range of frequencies. It may be appreciated that the to one or more first computing devices (124), and the one or more mobile devices (102) may not be restricted to the mentioned devices and various other devices may be used. A smart computing device may be one of the appropriate systems for storing data and other private/sensitive information.

Figure 2:
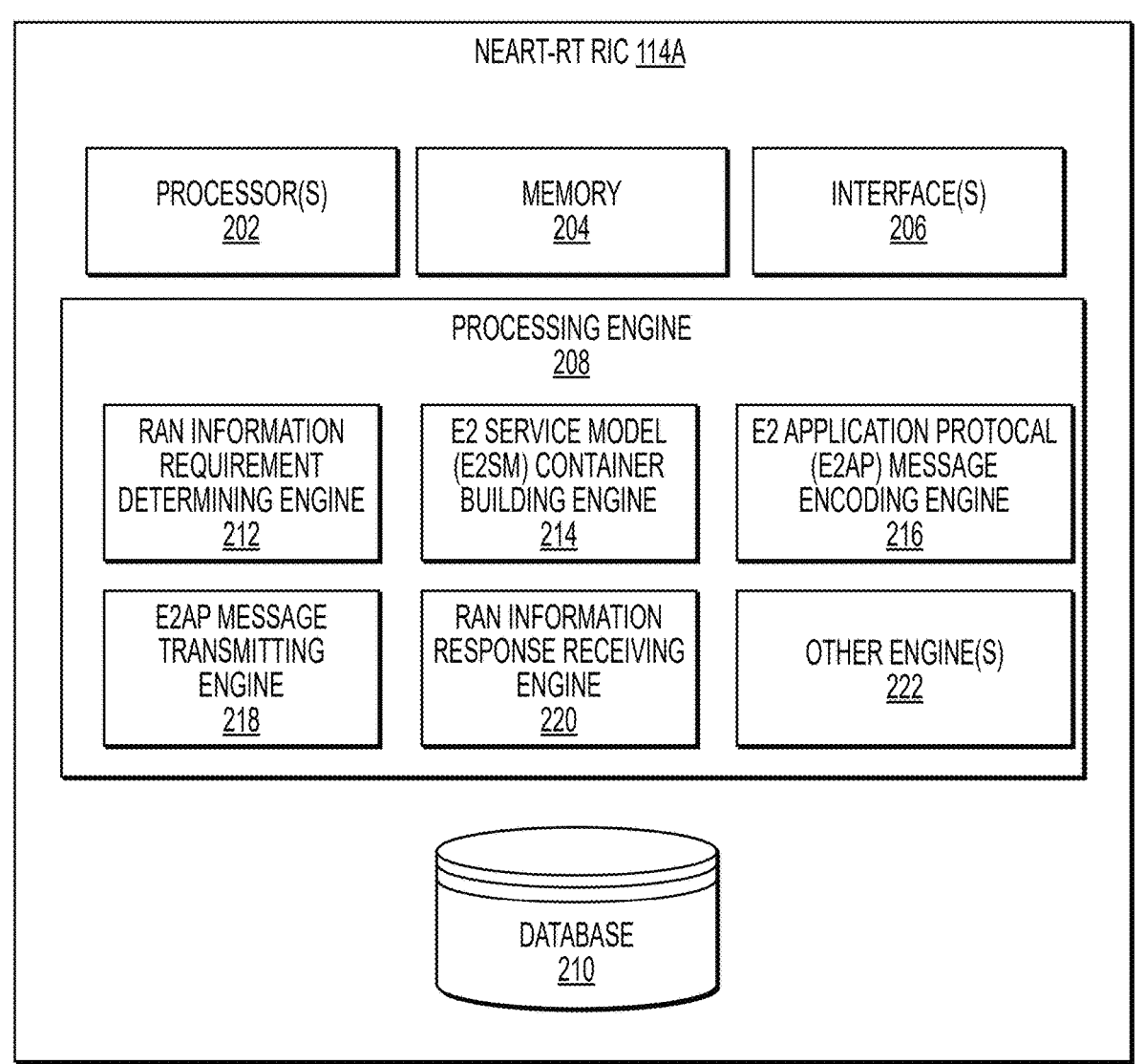
FIG. 2 illustrates an exemplary block diagram representation of a Near-RT RIC for retrieving Radio Access Network (RAN) information over an E2 interface of an Open Radio Access Network (O-RAN), using an information request response procedure, in accordance with an embodiment of the present disclosure.

FIG. 2 illustrates an exemplary block diagram representation of a Near-RT RIC (114A) for retrieving Radio Access Network (RAN) information over an E2 interface of an Open Radio Access Network (O-RAN), using an information request response procedure, in accordance with an embodiment of the present disclosure.

In an aspect, the Near-RT RIC (114A) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the Near-RT RIC (114A). The memory (204) may store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the Near-RT RIC (114A) may include an interface(s) 206. The interface(s) (206) may include a variety of interfaces, for example, interfaces for data input and output devices, referred to as I/O devices, storage devices, and the like. The interface(s) (206) may facilitate communication of the Near-RT RIC (114A). The interface(s) (206) may also provide a communication pathway for one or more components of the Near-RT RIC (114A). Examples of such components may include, but are not limited to, processing unit/engine(s) (208) and a database (210).

The processing units/engines (208) may be implemented as a combination of hardware and programming (for example, programmable instructions) to implement one or more functionalities of the processing engine(s) (208). In the examples described herein, such combinations of hardware and programming may be implemented in several different ways. For example, the programming for the processing engine(s) (208) may be processor-executable instructions stored on a non-transitory machine-readable storage medium and the hardware for the processing engines (208) may comprise a processing resource (for example, one or more processors), to execute such instructions. In the present examples, the machine-readable storage medium may store instructions that, when executed by the processing resource, implement the processing engine(s) (208). In such examples, the Near-RT RIC (114A) may include the machine-readable storage medium storing the instructions and the processing resource to execute the instructions, or the machine-readable storage medium may be separate but accessible to the Near-RT RIC (114A) and the processing resource. In other examples, the processing engines (208) may be implemented by electronic circuitry. Further, the Near-RT RIC (114A) may include Machine Learning (ML) modules.

The processing engines (208) may include one or more engines selected from any of a RAN information requirement determining engine (212), an E2 Service Model (E2SM) container building engine (214), an E2 Application Protocol (E2AP) message encoding engine (216), an E2AP message transmitting engine (218), a RAN information response receiving engine (220), and other engines (216).

In an embodiment, the RAN information requirement determining engine (212) may determine, if Radio Access Network (RAN) information is required by the Near-RT RIC (114A), based on an occurrence of at least one of non-subscription-based O-RAN use case scenarios and deployment scenarios in the Near-RT RIC (114A). In an embodiment, the non-subscription-based O-RAN use case scenarios and deployment scenarios include, but are not limited to, a data inconsistency use case scenario, a late onboarding of the one or more xAPPs deployment scenario, a rapidly varying RAN information use case scenario, and the like. In an embodiment, for determining, if Radio Access Network (RAN) information is required by the Near-RT RIC (114A), the Near-RT RIC (114A) may identify at least one of a non-synchronization of the RAN information between the E2 node and the one or more xAPPs (114B), a non-reception of periodical updates corresponding to the RAN information from the E2 node, and a rapid variation in the at least one of retrieved RAN information and reported RAN information within a short period.

In an embodiment, the E2 Service Model (E2SM) container building engine (214) may build an E2 Service Model (E2SM) container with a required type of information, when the RAN information is required.

In an embodiment, the E2 Application Protocol (E2AP) message encoding engine (216) may encode the built E2SM container in an E2 Application Protocol (E2AP) message.

In an embodiment, the E2AP message transmitting engine (218) may transmit the E2AP message as a RAN information request to an E2 node via an E2 interface associated with the O-RAN. In an embodiment, the RAN information request includes the E2SM container with the required type of information. In an embodiment, upon receiving the RAN information request by the E2 node, the E2 node may decode the E2AP message and determine the E2SM container. Further, the E2 node may decode the E2SM container to analyse the information requested. Furthermore, the E2 node may encode an E2SM container with the requested information within an E2AP message. Additionally, the E2 node may transmit the E2AP message as the RAN information response, to the Near-RT RIC (114A).

In an embodiment, the RAN information response receiving engine (220) may receive a RAN information response corresponding to the RAN information request, from the E2 node. The RAN information response is transmitted by the E2 node as an E2AP response message by encoding an E2SM container with a requested RAN information.

In an embodiment, for the data inconsistency use case scenario, the Near-RT RIC (114A) may establish a RIC subscription-based communication with the E2 node, for retrieving RAN information. Further, the Near-RT RIC (114A) may retrieve periodically, the RAN information through the RIC indication from the E2 node. Furthermore, the Near-RT RIC (114A) may identify periodically, the non-synchronization of the RAN information between the E2 node and the one or more xAPPs (114B). In an embodiment, the Near-RT RIC (114A) may transmit an E2AP message as a RAN information request to the E2 node, when the non-synchronization of the RAN information between the E2 node and the one or more xAPPs (114B) is identified. In an embodiment, the RAN information request includes the E2SM container with the required type of information. Further, the Near-RT RIC (114A) may receive a RAN information response corresponding to the RAN information request, from the E2 node. In an embodiment, the RAN information response is transmitted by the E2 node as an E2AP response message by encoding an E2SM container with a requested RAN information. In an embodiment, upon receiving the RAN information from the E2 Node, the Near-RT RIC (114A) executes the Near-RT RIC (114A) to resolve the data inconsistency use case scenario.

In an embodiment, for the late onboarding of the one or more xAPPs deployment scenario, the Near-RT RIC (114A) may identify a delay in the onboarding of the one or more xAPPs (114B), by determining a lapse of pre-defined time for onboarding after start-up of the Near-RT RIC (114A). Further, the Near-RT RIC (114A) may determine, if historical RAN information is required by the one or more xAPPs (114B). Furthermore, the Near-RT RIC (114A) may transmit an E2AP message as a RAN information request to the E2 node, when the historical RAN information is required. The RAN information request includes the E2SM container with the required type of information. Additionally, the Near-RT RIC (114A) may receive a RAN information response corresponding to the RAN information request, from the E2 node. The RAN information response is transmitted by the E2 node as an E2AP response message by encoding an E2SM container with a requested RAN information.

In an embodiment, for the rapidly varying RAN information use case scenario, the Near-RT RIC (114A) may determine periodically, the at least one of retrieved RAN information and reported RAN information has a rapid variation within a short period, compared to previously retrieved RAN information and reported RAN information, respectively. Furthermore, the Near-RT RIC (114A) may determine, if a complete RAN information is required by the Near-RT RIC (114A), when the at least one of retrieved RAN information and reported RAN information has rapid variation within the short period. Additionally, the Near-RT RIC (114A) may transmit an E2AP message or a RAN information request to the E2 node, when the complete RAN information is required. The RAN information request includes the E2SM container with the required type of information. Further, the Near-RT RIC (114A) may receive a RAN information response corresponding to the RAN information request, from the E2 node. The RAN information response is transmitted by the E2 node as an E2AP response message by encoding an E2SM container with a requested RAN information.

Figure 3:
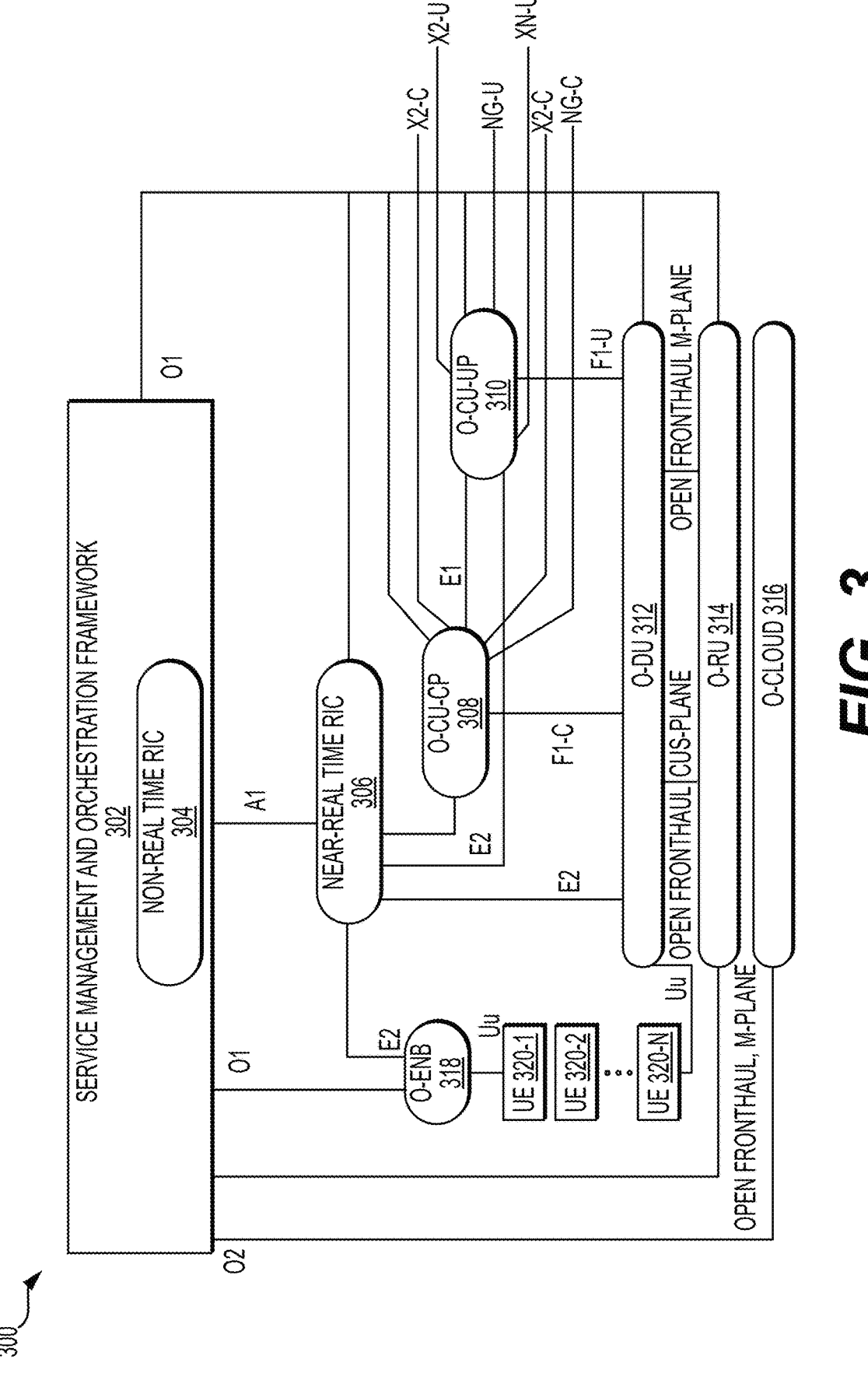
FIG. 3 illustrates an exemplary block diagram representation of an existing open Radio Access Network (O-RAN) architecture (300), in accordance with an embodiment of the present disclosure.

FIG. 3 illustrates an exemplary block diagram representation of an existing open Radio Access Network (O-RAN) architecture (300), in accordance with an embodiment of the present disclosure.

The O-RAN architecture (300) may include the rAPPs (112) which includes an interface where external information can be fed to the operator network. The Near-RT RIC (306) (shown as the Near-RT RIC (114A) in FIG. 1) may be a logical function that enables near-real-time control and optimization of RAN elements and resources via fine-grained data collection and actions over an E2 interface, as shown in FIG. 3. The Near-RT RIC (306) may include Artificial Intelligence (AI)/Machine Learning (ML) workflow including model training, inference, and updates which are handled by the xAPPs (114B).

Further, the Non-RT RIC (304) (shown as Non-RT RIC (110) in FIG. 1) may include a logical function within a Service Management and Orchestration system (SMO) (302) (shown as the SMO system (108) in FIG. 1), that may drive the content carried across an A1 interface, as shown in FIG. 3. The Non-RT RIC (304) may include a Non-RT RIC framework and the Non-RT RIC applications such as the rAPPs (112). Furthermore, the Non-RT RIC framework may function internal to the SMO system (302), which logically terminates the A1 interface to the Near-RT RIC (306) and may expose a set of internal SMO services needed for their runtime processing, to the rAPPs (112), via a R1 interface. The Non-RT RIC framework may function within the Non-RT RIC (304) and may provide AI/ML workflow including model training, inference, and updates needed for rAPPs (112).

Further, an O1 interface from the O-RAN components may terminate at the SMO system (302). An Open radio access network Central Unit User Plane (O-CU-UP) (310) may be a logical node hosting a Radio Resource Control (RRC) and the control plane part of a Packet Data Convergence Protocol (PDCP) protocol. Further, the O-CU-UP (310) may be a logical node hosting the user plane part of the PDCP protocol and a Service Data Adaptation Protocol (SDAP) protocol. An Open radio access network Distributed Unit (O-DU) (312) (shown as the O-DU (106) in FIG. 1) may be a logical node hosting Radio Link Control (RLC)/Medium Access Control (MAC)/High-Physical (PHY) layers based on a lower layer functional split. The E2 node may be a logical node terminating at an E2 interface. Further, O-RAN nodes may be terminating at the E2 interface that is, for New Radio (NR) access O-CU-CP (308), O-CU-UP (310), O-DU (312), or any combination, and for an Evolved Universal Terrestrial Radio Access (E-UTRA) access such as an o-eNB (318). Further, Non-RT RIC applications such as the rAPPs (112) may be modular applications that leverage the functionality exposed via a R1 interface of the Non-RT RIC framework, to provide added value services relative to a RAN operation. The added value services relative to the RAN operation include, but are not limited to, driving the A1 interface, recommending values and actions that may be subsequently applied over the O1/O2 interface, and generating "enrichment information" for the use of other rAPPs (112), and the like. The rAPPs (112) may function within the Non-RT RIC (304) that enables non-real-time control and optimization of RAN elements and resources and policy-based guidance to the applications/features in the Near-RT RIC (306). Further, the Near-RT RIC applications such as xAPPs (114B) may run on the Near-RT RIC (306). Such an application may be likely to consist of one or more microservices and at the point of onboarding may identify which data it consumes and which data it provides. The application is independent of the Near-RT RIC (306) and may be provided by any third party. The E2 enables a direct association between the xAPPs (114B) and the RAN functionality.

Further, an o-Cloud (316) may be a cloud computing platform which includes a collection of physical infrastructure nodes that meet O-RAN requirements to host the relevant O-RAN functions of the Near-RT RIC (306), the O-CU-CP (308), the O-CU-UP (310), and the O-DU (312), the supporting software components (such as Operating System, Virtual Machine Monitor, Container Runtime, and the like.) and the appropriate management and orchestration functions. In addition, the O1 interface may be between SMO framework and O-RAN managed elements, for operation and management, by which may be a Fault, Configuration, Accounting, Performance, Security (FCAPS) management, Physical Network Function (PNF) software management, file management may be achieved. Further, the O2 interface may be between the SMO framework and the O-Cloud (316) for supporting O-RAN virtual network functions. Furthermore, the A1 interface between the Non-RT RIC (304) and the Near-RT RIC (306). The purpose of the A1 interface may be to enable the non-RT RIC function to provide policy-based guidance, ML model management, and enrichment information to the Near-RT RIC function so that the RAN can optimize e.g., Radio Resource Management (RRM) under certain conditions. Thereafter, the E2 interface may be to connect the Near-RT RIC (306) and one or more O-CU-CPs (308), one or more O-CU-UPs (310), and one or more O-DUs (312). The R1 interface may be between rAPPs (112) and the Non-RT RIC framework.

Although not shown in FIG. 3, the O-eNB (318) may not support the O-DU (312) and the O-RU (314) (shown as the O-RU (104) in FIG. 1) functions with an Open Fronthaul interface between them. The management side includes the SMO framework including a Non-RT-RIC function. The o-Cloud (316), on the other hand, is a cloud computing platform comprising a collection of physical infrastructure nodes that meet O-RAN requirements to host the relevant O-RAN functions (such as Near-RT RIC (306), the O-CU-CP (308), the O-CU-UP (310) and the O-DU (312), and the like), the supporting software components (such as Operating System, Virtual Machine Monitor, Container Runtime, and the like.) and the appropriate management and orchestration functions. As shown in FIG. 3, the O-RU (314) terminates the Open Fronthaul M-Plane interface towards the O-DU (312) and the SMO system (302). The o-eNB (318) enables communication with one or more User Equipment (UE) (320-1. 320-2, . . . , 320-N) (i.e., mobile device (102) shown in FIG. 1), using a Uu interface as shown in FIG. 3.

Embodiments herein address issues faced in communication between two ORAN systems, Near-RT RIC (306) and E2 Node. Near-RT RIC (306) and the E2 Node are two ORAN systems that are connected via O-RAN standardized interfaces such as the E2 interface.

Figure 4A:
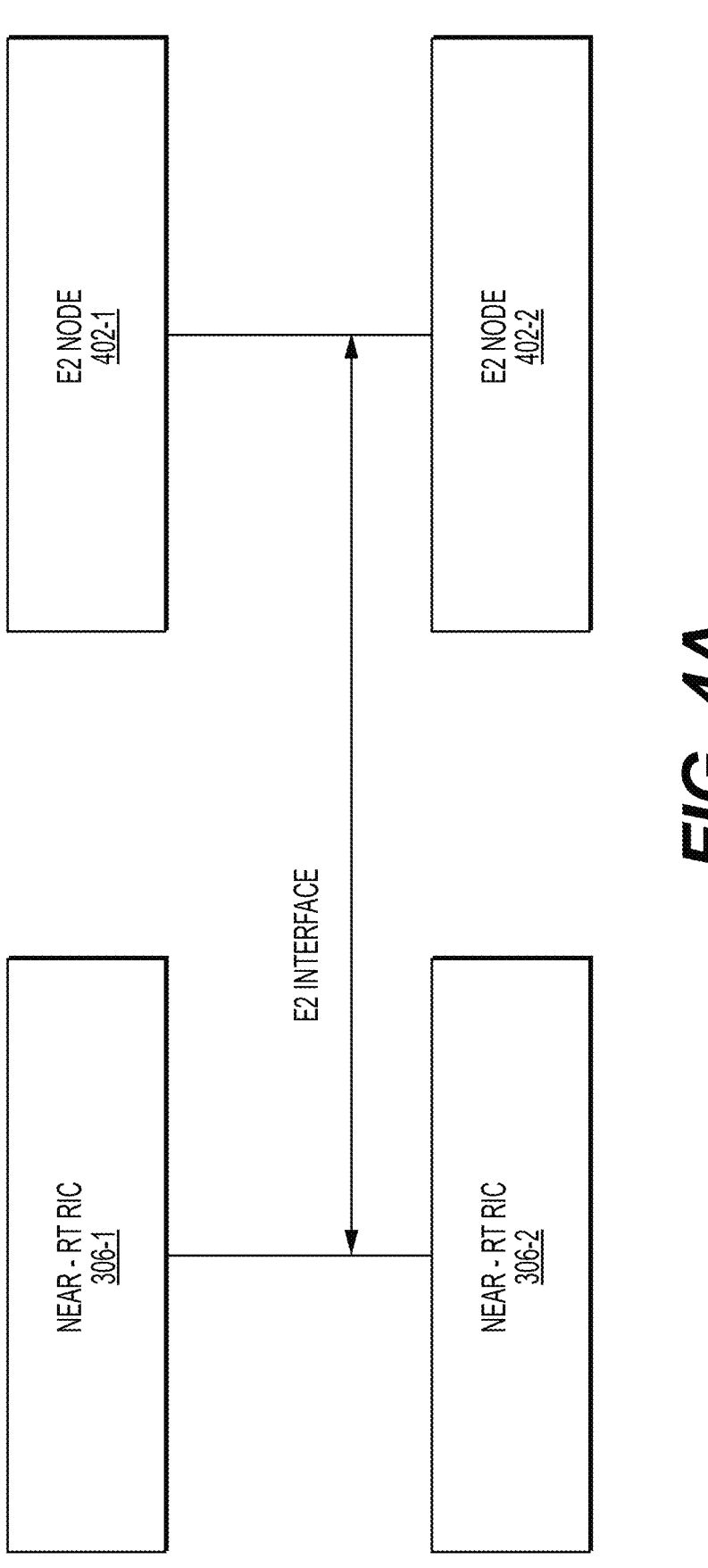
FIG. 4A illustrates an exemplary block diagram representation of an interaction between the Near-RT RICs and the E2 Nodes, in accordance with an embodiment of the present disclosure.

FIG. 4A illustrates an exemplary block diagram representation of an interaction between the Near-RT RICs and the E2 Nodes, in accordance with an embodiment of the present disclosure. As illustrated, there may be a communication between two O-RAN systems such as at least two Near-RT RIC (306-1, 306-2) and the E2 Nodes (402-1, 402-2). The Near-RT RIC (306-1, 306-2) and the E2 Nodes (402-1, 402-2) are two O-RAN systems which are connected via O-RAN standardized interfaces such as the E2 interface.

Figure 4B:
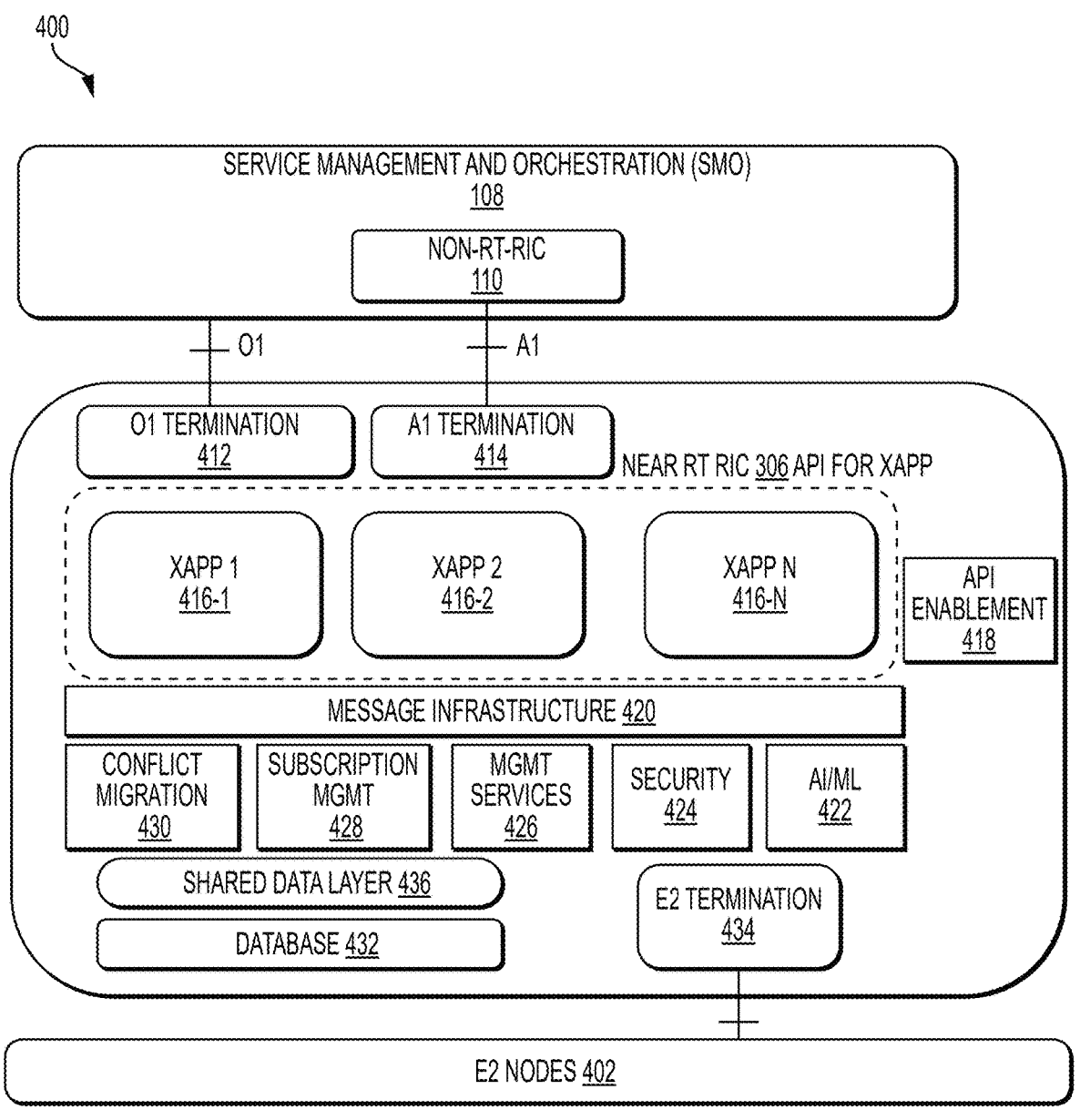
FIG. 4B illustrates an exemplary block diagram representation of a Near Real-Time Radio access network Intelligent Controller (Near-RT RIC) architecture associated with the O-RAN, in accordance with an embodiment of the present disclosure.

FIG. 4B illustrates an exemplary block diagram representation of a Near Real-Time Radio access network Intelligent Controller (Near-RT RIC) architecture (400) associated with the O-RAN, in accordance with an embodiment of the present disclosure. As illustrated, the architecture (400) of the Near-RT RIC (306) may include a plurality of subsystems as shown in FIG. 4B.

A plurality of the xAPPs (416-1, 416-2, . . . , 416-N) (individually referred to as the xAPPs (416) and collectively referred to as the xAPPs (416)) (shown as the xAPPs (114B) in FIG. 1) within the Near-RT RIC (306) is where logic or an algorithm to perform any operation may be hosted. The Near-RT RIC (306) functions may be determined by the xAPPs (416) hosted within the Near-RT RIC (306). Based on the data received from the E2 Node (402) and the AI/ML algorithms running in the xAPPs (416), the xAPPs (416) may control the behaviour of the E2 Nodes (402). The SMO system (302) may include Non-RT RIC (304), which may connect via O1 and A1 interface to the Near-RT RIC (306). The O1 may terminate (412) and the A1 may terminate (414), as shown in FIG. 4B. The Near RT-RIC architecture (400) may further include a message infrastructure (420) and an Application Programming Interface (API) enablement module (418) together with a conflict migration module (430), a subscription management module (428), a management services module (426), a security services (424), an AI/ML support module (422), a database (432), an E2 termination module (434), and a shared data layer (436). The E2 termination module (434) may be configured to terminate the communication to and from the E2 nodes (402).

The E2 interface has defined a standard set of methods for communication between Near-RT RIC (306) and E2 Nodes (402) over the E2 interface. However, all the methods defined for communication over the E2 interface are subscription-based methods. The subscription-based method of communication works only when any event is triggered in the E2 Node (402). When any defined Event is triggered in E2 Node (402), then the corresponding action to report any data or perform any control action happens in E2 Node (402) periodically. The subscription-based communication mechanism is useful in scenarios where periodical monitoring and controlling are needed. However, there are scenarios or use cases in Near-RT RIC (306) where the subscription-based communication mechanism does not work. The present disclosure addresses those use cases where subscription-based communication does not work and a one-time instantaneous fetch of information is needed.

Figure 4C:
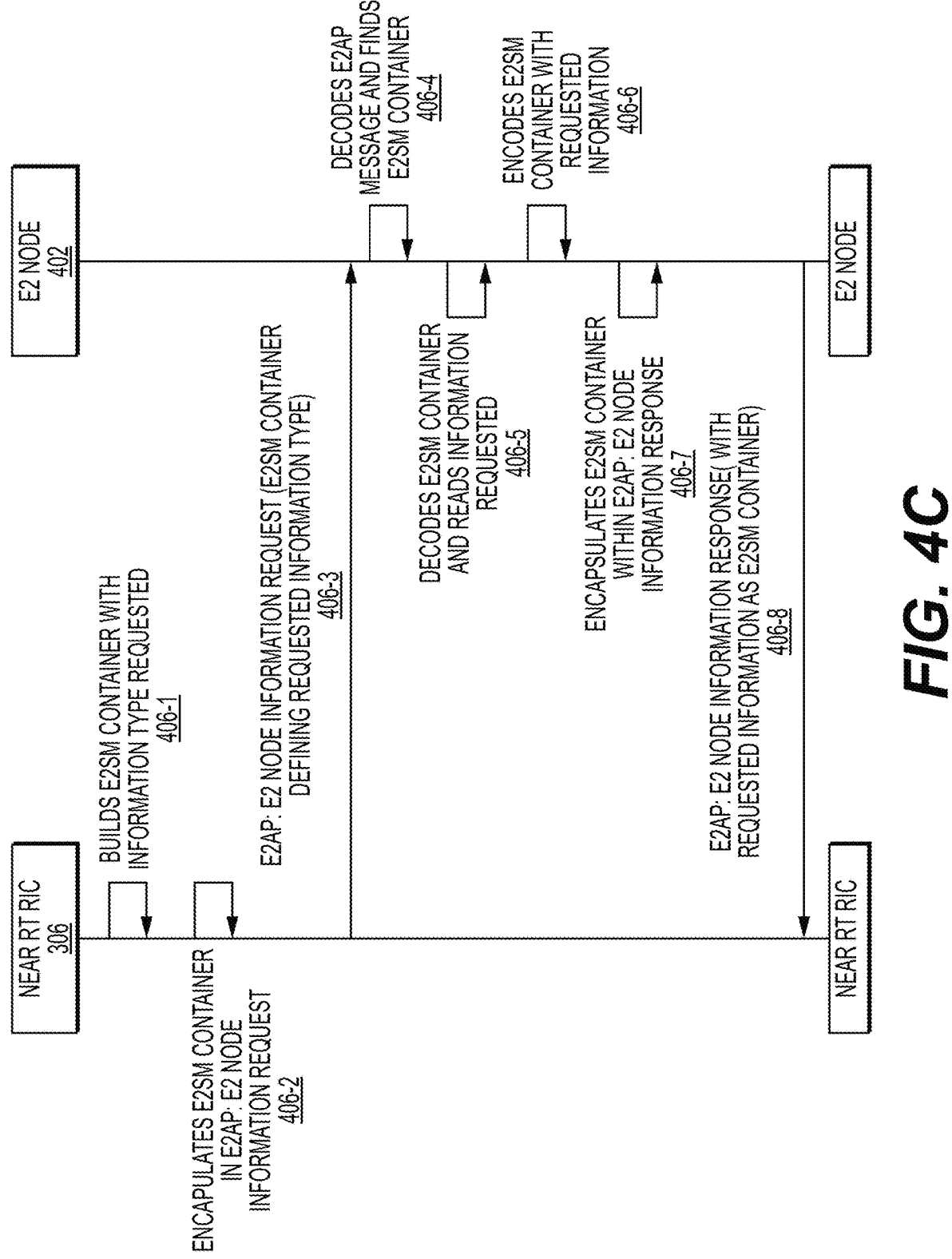
FIG. 4C illustrates a sequence diagram representation of message flow for retrieving Radio Access Network (RAN) information, when it is required to perform RAN monitoring or control action, in accordance with an embodiment of the present disclosure.

FIG. 4C illustrates a sequence diagram representation of message flow for retrieving Radio Access Network (RAN)

information, when it is required to perform RAN monitoring or control action, in accordance with an embodiment of the present disclosure.

At step (406-1), the Near-RT RIC (306) may build E2 Service Model (E2SM) container with the information type needed. At step (406-2), the Near-RT RIC (306) may encode the E2SM container in the proposed message E2 Application Protocol (E2AP), which is an E2 node information request. At step (406-3), the Near-RT RIC (306) may send E2AP, which is an E2 node information request with an E2SM container to the E2 node (402). At step (406-4), the E2 node (402) may decode the E2AP message and finds the E2SM container. At step (406-5), the E2 node (402) may decode the E2SM container and reads the information requested. At step (406-6), the E2 node (402) may encode the E2SM container with the requested information. At step (406-7), the E2 node (402) may encapsulate the E2SM container within E2AP, which is the E2 node information response. At step (406-8), the E2 node (402) may send E2AP, which is the E2 node information response (with requested information in the E2SM container).

Figure 5A:
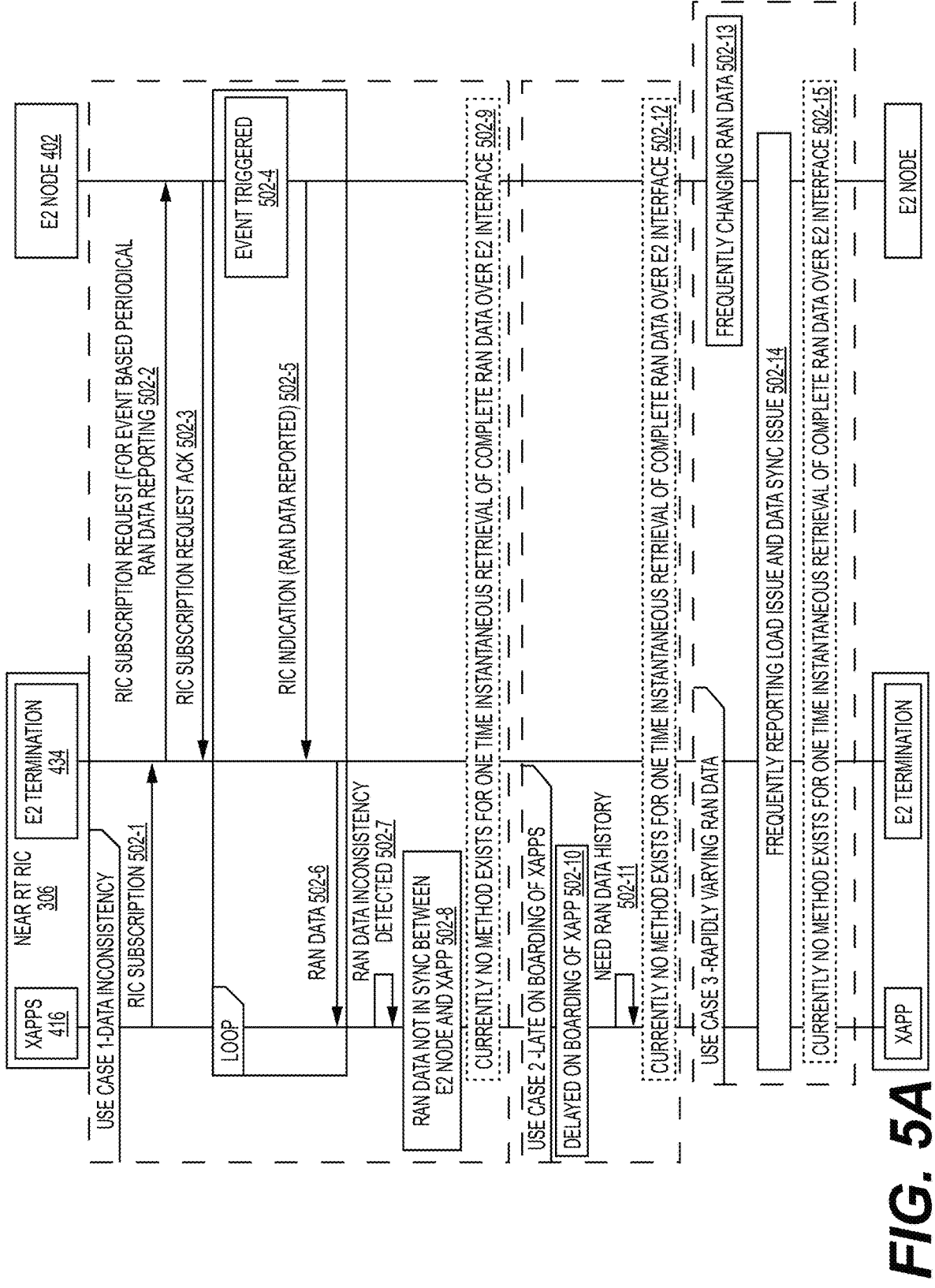
FIG. 5A illustrates a sequence diagram representation of an existing communication method between Near-RT RIC and E2 node, in accordance with an embodiment of the present disclosure.

FIG. 5A illustrates a sequence diagram representation of an existing communication method between Near-RT RIC (306) and E2 node (402), in accordance with an embodiment of the present disclosure.

Exemplary Scenario 1 (Existing Communication Method):
Use Case 1: Data Inconsistency (Existing Method)

At step (502-1), the xAPPs (416) may transmit a RIC subscription request to an E2 termination (434). At step (502-2), the E2 termination (434) may transmit a RIC subscription request (for event-based periodical RAN information reporting) to the E2 node (402). At step (502-3), the E2 node (402) may transmit back a RIC subscription request acknowledgment, to the E2 termination (434).

At step (502-4), the E2 node (402) may trigger an event. At step (502-5), the E2 node (402) may transmit a RIC indication with the RAN information to the E2 termination (434). At step (502-6) the E2 termination (434) may transmit the RAN information to the xAPPs (416). At step (502-7), the xAPPs (416) may detect the information has a data inconsistency. At step (502-8), the xAPPs (416) may not be in-synchronization between the E2 node (402) and the xAPPs (416). At step (502-9), the existing communication method between the Near-RT RIC (306) and the E2 node (402) may not find any method for one-time instantaneous retrieval of complete RAN data over the E2 interface.

Exemplary Scenario 2 (Existing Communication Method):
Use Case 2: Late Onboarding of xAPPs (Existing Method)

At step (502-10), the xAPPs (416) may onboard with a delay. At step (502-11), the xAPPs (416) may determine a need for historical RAN information. At step (502-12), the existing communication method between the Near-RT RIC (306) and E2 node (402) may not find any method for one-time instantaneous retrieval of historical RAN information over the E2 interface.

Exemplary Scenario 3 (Existing Communication Method):
Use Case 3: Rapidly Varying RAN Data (Existing Method)

At step (502-13), the E2 node (402) may have a frequently changing/varying RAN information. At step (502-14), the existing communication method may frequently report load issues and data synchronization issues. At step (502-15), the existing communication method between the Near-RT RIC (306) and the E2 node (402) may not find any method for one-time instantaneous retrieval of complete RAN information over the E2 interface.

Figure 5B:
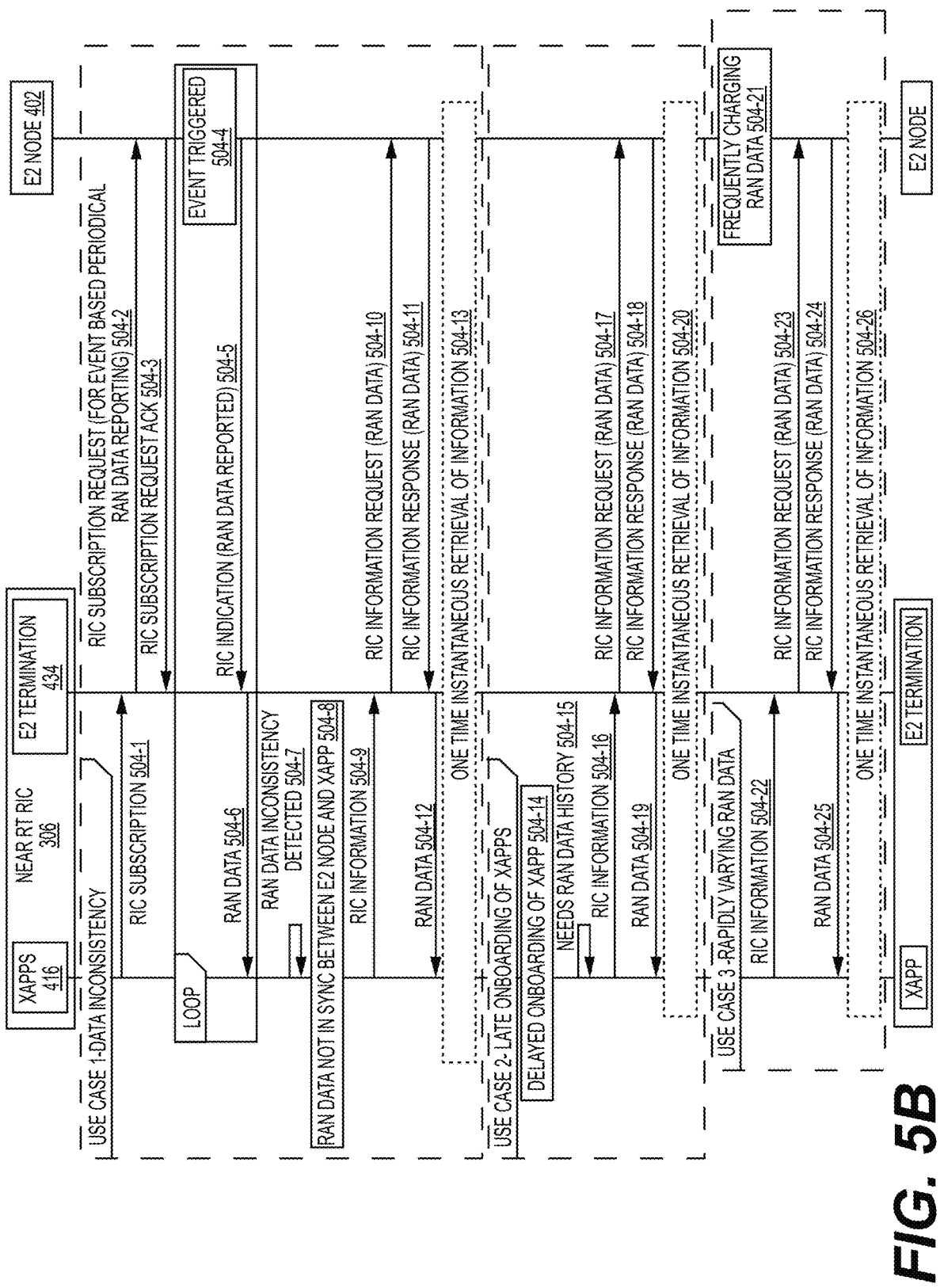
FIG. 5B illustrates an exemplary sequence diagram representation of retrieving Radio Access Network (RAN) information over the E2 interface of the Open Radio Access Network (O-RAN), using the proposed method, in accordance with an embodiment of the present disclosure.

FIG. 5B illustrates an exemplary sequence diagram representation of retrieving Radio Access Network (RAN)

information over the E2 interface of the Open Radio Access Network (O-RAN), using the proposed method, in accordance with an embodiment of the present disclosure.

Exemplary Scenario 1 (Proposed Method):
Use Case 1: Data Inconsistency (Proposed Method)

At step (504-1), the xAPPs (416) may transmit a RIC subscription to the E2 termination (434). At step (504-2), the E2 termination (434) may transmit a RIC subscription request (for event-based periodical RAN data reporting) to the E2 node (402). At step (504-3), the E2 node (402) may transmit back a RIC subscription acknowledgment to the E2 termination (434).

At step (504-4), the E2 node (402) may trigger an event. At step (504-5), the E2 node (402) may transmit a RIC indication with the RAN information to the E2 termination (434). At step (504-6) the E2 termination (434) may transmit the RAN information to the xAPPs (416). At step (504-7), the xAPPs (416) may detect an inconsistency in RAN information (data inconsistency). At step (504-8), the xAPPs (416) may not be in-synchronization between the E2 node (402) and the xAPPs (416). At step (504-9), the xAPPs (416) may transmit a RIC information request (i.e., RAN information request) to the E2 termination (434). At step (504-10) the E2 termination (434) may transmit the RIC information request to the E2 node (402). At step (504-11), the E2 node (402) may transmit back a RIC information response with RAN information to the E2 termination (434). At step (504-12), the E2 termination (434) may transmit the RAN information to the xAPPs (416). At step (504-13), the Near-RT RIC (306) may perform one-time instantaneous retrieval of the RAN information.

Exemplary Scenario 2 (Proposed Method):
Use Case 2: Late Onboarding of xAPPs (Proposed Method)

At step (504-14), the xAPPs (416) may be on-board with a delay. At step (504-15), the xAPPs (416) may determine a need for historical RAN information. At step (504-16), the xAPPs (416) may transmit a RIC information request (i.e., the RAN information request) to the E2 termination (434). At step (504-17) the E2 termination (434) may transmit the RIC information request to the E2 node (402). At step (504-18), the E2 node (402) may transmit back RIC information response with the RAN information to the E2 termination (434). At step (504-19), the E2 termination (434) may transmit the RAN information to the xAPPs (416). At step (504-20), the Near-RT RIC (306) may perform one-time instantaneous retrieval of the RAN information.

Exemplary Scenario 3 (Proposed Method):
Use Case 3: Rapidly Varying RAN Data (Proposed Data)

At step (504-21), the E2 node (402) may have frequently changing/varying RAN information. At step (504-22), the xAPPs (416) may transmit a RIC information request (i.e., RAN information request) to the E2 termination (434). At step (504-23) the E2 termination (434) may transmit the RIC information request to the E2 node (402). At step (504-24), the E2 node (402) may transmit back the RIC information response with RAN information to the E2 termination (434). At step (504-25), the E2 termination (434) may transmit the RAN information to the xAPPs (416). At step (504-26), the Near-RT RIC (306) may perform one-time instantaneous retrieval of the information.

Figure 6:
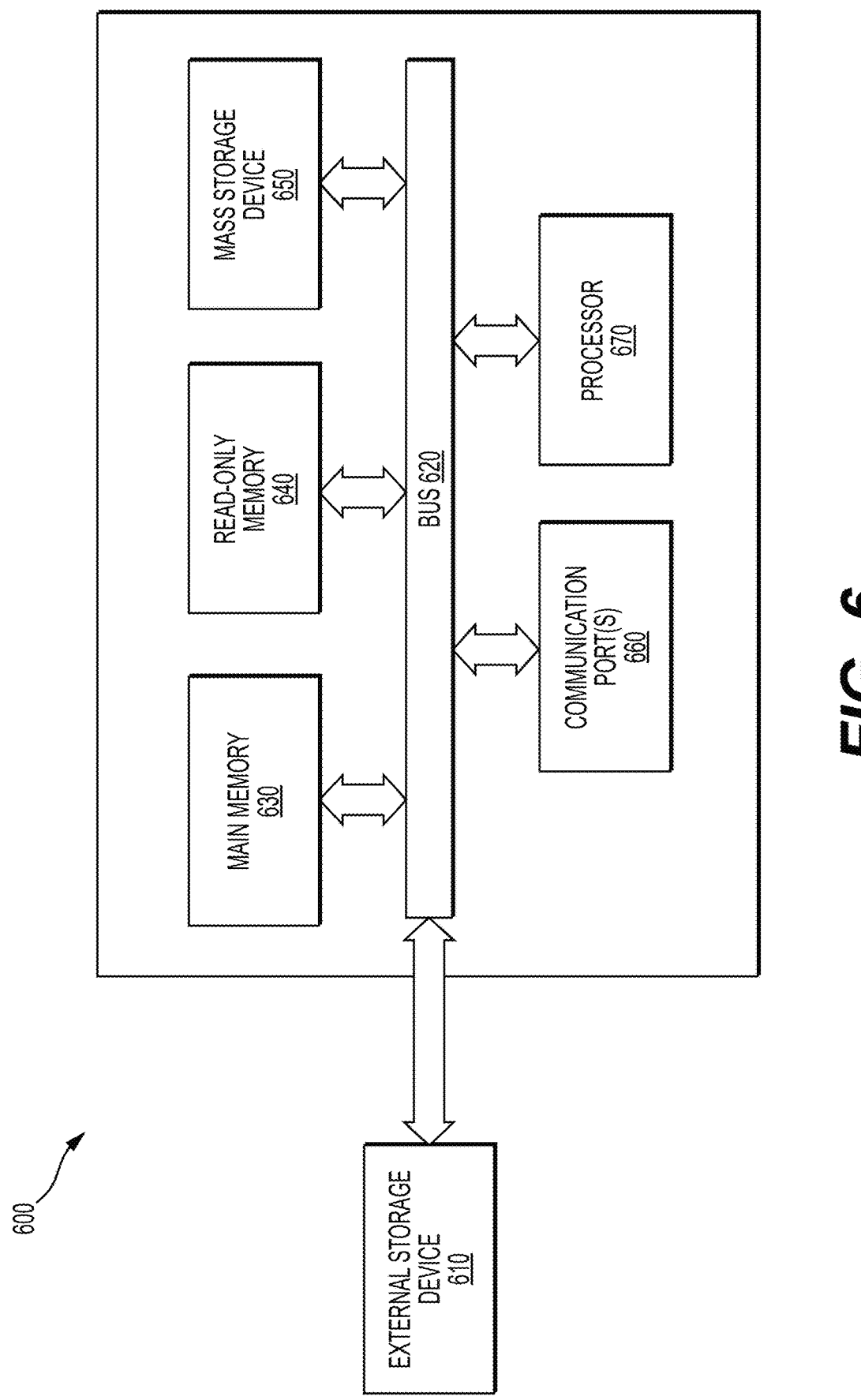
FIG. 6 illustrates an exemplary computer system in which or with which embodiments of the present invention can be utilized, in accordance with embodiments of the present disclosure.

FIG. 6 illustrates an exemplary computer system in which or with which embodiments of the present invention can be utilized in accordance with embodiments of the present disclosure. As shown in FIG. 6, computer system (600) can include an external storage device (610), a bus (620), a main memory (630), a read-only memory 640, a mass storage device (650), a communication port (660), and a processor (670). A person skilled in the art will appreciate that the computer system may include more than one processor and communication ports. Examples of processor (670) include, but are not limited to, an Intel® Itanium® or Itanium 2 processor(s), or AMD® Opteron® or Athlon MP® processor(s), Motorola® lines of processors, FortiSOC™ system on chip processors, or other future processors. Processor (670) may include various modules associated with embodiments of the present invention. Communication port (660) can be any of an RS-232 port for use with a modem-based dialup connection, a 10/100 Ethernet port, a Gigabit or 10 Gigabit port using copper or fiber, a serial port, a parallel port, or other existing or future ports. Communication port (660) may be chosen depending on a network, such as a Local Area Network (LAN), Wide Area Network (WAN), or any network to which the computer system connects. Memory (630) can be Random Access Memory (RAM), or any other dynamic storage device commonly known in the art. Read-only memory (640) can be any static storage device(s) e.g., but not limited to, a Programmable Read Only Memory (PROM) chips for storing static information e.g., start-up or BIOS instructions for processor 670. Mass storage (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (620) communicatively couples' processor(s) (670) with the other memory, storage, and communication blocks. Bus (620) can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor (670) to a software system.

Optionally, operator and administrative interfaces, e.g., a display, keyboard, and a cursor control device, may also be coupled to a bus (620) to support direct operator interaction with a computer system. Other operator and administrative interfaces can be provided through network connections connected through a communication port (660). The external storage device (610) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter is to be implemented merely as illustrative of the invention and not as a limitation.

Advantages of the Present Disclosure

The present disclosure provides an efficient, improved, and instantaneous systems and methods for retrieving Radio Access Network (RAN) information over the E2 interface of an Open Radio Access Network (O-RAN), using an information request response procedure.

The present disclosure addresses issues faced in communication between two O-RAN systems—Near-RT RIC and E2 Node.

The present disclosure addresses use cases where subscription-based communication does not work and a one-time instantaneous fetch of information is needed.

The present disclosure provides systems and methods for retrieving data to perform a one-time fetch of the complete data when any operation needs to be performed on the data.

The present disclosure implies to both Near-RT RIC and E2 node that instant information is needed and may be immediately sent by E2 Node.

The present disclosure eliminates any event triggers or periodic reporting of information, unlike RIC subscription which is the preferred communication mechanism for use cases such as data inconsistency, late onboarding of xAPPs, and rapidly varying RAN data. Once the information is sent by E2 Node, the procedure is complete. Information is carried as transparent containers over the E2 interface.

The present disclosure invokes the information request/response procedure via the Near-RT RIC to retrieve the complete snapshot of RAN data (e.g., UE context and cell context) available in the E2 Node. Once the RAN data is sent by E2 Node, Near-RT RIC may use the available RAN data and resolve the data inconsistency. Near-RT RIC may then use the periodical data reporting from E2 Node due to RIC subscription to maintain the data synchronization.

The present disclosure retrieves via the E2 interface, a complete snapshot of information by invoking the information request/response procedure and then subscribes to a periodical update of RAN data.

The present disclosure avoids using the existing subscription-based mechanism for information retrieval. The present disclosure has information request and response procedures without event triggers or periodic reporting of information.

The present disclosure provides systems and methods for retrieving information in a faster mechanism using a two-way handshake (request/response) message.

Reservation of Rights

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

I claim:

1. A system for retrieving Radio Access Network (RAN) using an information request response procedure, the system comprising:

a Near Real Time Radio access network Intelligent Controller (Near-RT RIC), wherein the Near-RT RIC comprises:

a processor; and a memory coupled to the processor, wherein the memory comprises processor-executable instructions corresponding to one or more xAPPs associated with the Near-RT RIC, which on execution, cause the processor to:

determine, Radio Access Network (RAN) information is required by the Near-RT RIC, based on an occurrence of at least one of non-subscription-based Open Radio Access Network (O-RAN) use case scenarios and deployment scenarios in the Near-RT RIC, wherein the non-subscription-based O-RAN use case scenarios and deployment scenarios comprise a data inconsistency use case scenario, a late onboarding of the one or more xAPPs deployment scenario, and a rapidly varying RAN information use case scenario, wherein for the late onboarding of the one or more xAPPs deployment scenario, the processor is further configured to:

identify a delay in the onboarding of the one or more xAPPs, by determining a lapse of pre-defined time for onboarding after start-up of the Near-RT RIC;

determine, historical RAN information is required by the one or more xAPPs;

transmit an E2AP message as a RAN information request to the E2 node, when the historical RAN information is required, wherein the RAN information request comprises the E2SM container with the required type of information; and receive a RAN information response corresponding to the RAN information request, from the E2 node, wherein the RAN information response is transmitted by the E2 node as an E2AP response message by encoding an E2SM container with a requested RAN information;

build an E2 Service Model (E2SM) container with a required type of information, when the RAN information is required;

encode the built E2SM container in an E2 Application Protocol (E2AP) message;

transmit the E2AP message as a RAN information request to an E2 node via an E2 interface associated with the O-RAN, wherein the RAN information request comprises the E2SM container with the required type of information; and receive a RAN information response corresponding to the RAN information request, from the E2 node, wherein the RAN information response is transmitted by the E2 node as an E2AP response message by encoding the E2SM container with the requested RAN information, wherein the RAN information is retrieved over the E2 interface in the O-RAN, using a RAN information request response procedure.

2. The system as claimed in claim 1, wherein for determining, the Radio Access Network (RAN) information is required by the Near-RT RIC, the processor is further configured to:

identify at least one of:

a non-synchronization of the RAN information between the E2 node and the one or more xAPPs, a non-reception of periodical updates corresponding to the RAN information from the E2 node, and a rapid variation in the at least one of retrieved RAN information and reported RAN information within a short period.

3. The system as claimed in claim 1, wherein for the data inconsistency use case scenario, the processor is further configured to:

establish a RIC subscription-based communication with the E2 node, for retrieving RAN information;

retrieve periodically, the RAN information through the RIC indication from the E2 node;

identify periodically, the non-synchronization of the RAN information between the E2 node and the one or more xAPPs;

transmit an E2AP message as a RAN information request to the E2 node, when the non-synchronization of the RAN information between the E2 node and the one or more xAPPs is identified, wherein the RAN information request comprises the E2SM container with the required type of information; and receive a RAN information response corresponding to the RAN information request, from the E2 node, wherein the RAN information response is transmitted by the E2 node as an E2AP response message by encoding an E2SM container with a requested RAN information.

4. The system as claimed in claim 3, wherein upon receiving the RAN information from the E2 Node, the processor executes the Near-RT RIC to resolve the data inconsistency use case scenario.

5. The system as claimed in claim 1, wherein for the rapidly varying RAN information use case scenario, the processor is further configured to:

determine periodically, the at least one of retrieved RAN information and reported RAN information has a rapid variation within a short period, compared to previously retrieved RAN information and reported RAN information, respectively;

determine, a complete RAN information is required by the Near-RT RIC, when the at least one of retrieved RAN information and reported RAN information has rapid variation within the short period;

transmit an E2AP message a RAN information request to the E2 node, when the complete RAN information is required, wherein the RAN information request comprises the E2SM container with the required type of information; and receive a RAN information response corresponding to the RAN information request, from the E2 node, wherein the RAN information response is transmitted by the E2 node as an E2AP response message by encoding an E2SM container with a requested RAN information.

6. The system as claimed in claim 1, wherein upon receiving the RAN information request by the E2 node, the E2 node is configured to:

decode the E2AP message and determine the E2SM container;

decode the E2SM container to analyse the information requested;

encode an E2SM container with the requested information within an E2AP message; and transmit the E2AP message as the RAN information response, to the Near-RT RIC.

7. A method for retrieving Radio Access Network (RAN) information, the method comprising:

determining, by a processor associated with a Near Real Time Radio access network Intelligent Controller (Near-RT RIC) in a system, a Radio Access Network (RAN) information is required by the Near-RT RIC, based on an occurrence of at least one of non-subscription-based O-RAN use case scenarios and deployment scenarios in the Near-RT RIC, wherein the non-subscription-based O-RAN use case scenarios and deployment scenarios comprise a data inconsistency use case scenario, a late onboarding of the one or more xAPPs deployment scenario, and a rapidly varying RAN information use case scenario wherein the late onboarding of the one or more xAPPs deployment scenario further comprises:

identifying, by the processor, a delay in the onboarding of the one or more xAPPs, by determining a lapse of pre-defined time for onboarding after start-up of the Near-RT RIC;

determining, by the processor, historical RAN information is required by the one or more xAPPs;

transmitting, by the processor, an E2AP message as a RAN information request to the E2 node, when the historical RAN information is required, wherein the RAN information request comprises the E2SM container with the required type of information; and receiving, by the processor, a RAN information response corresponding to the RAN information request, from the E2 node, wherein the RAN information response is transmitted by the E2 node as an E2AP response message by encoding an E2SM container with a requested RAN information;

building, by the processor, an E2 Service Model (E2SM) container with a required type of information, when the RAN information is required;

encoding, by the processor, the built E2SM container in an E2 Application Protocol (E2AP) message;

transmitting, by the processor, the E2AP message as a RAN information request to an E2 node via an E2 interface associated with the O-RAN, wherein the RAN information request comprises the E2SM container with the required type of information; and receiving, by the processor, a RAN information response corresponding to the RAN information request, from the E2 node, wherein the RAN information response is transmitted by the E2 node as an E2AP response message by encoding the E2SM container with the requested RAN information, wherein the RAN information is retrieved over the E2 interface in the O-RAN, using a RAN information request response procedure.

8. The method as claimed in claim 7, wherein determining, the Radio Access Network (RAN) information is required by the Near-RT RIC, further comprises:

identifying, by the processor, at least one of:

a non-synchronization of the RAN information between the E2 node and the one or more xAPPs, a non-reception of periodical updates corresponding to the RAN information from the E2 node, and a rapid variation in the at least one of retrieved RAN information and reported RAN information within a short period.

9. The method as claimed in claim 7, wherein the data inconsistency use case scenario further comprises:

establishing, by the processor, a RIC subscription-based communication with the E2 node, for retrieving RAN information;

retrieving, by the processor, periodically, the RAN information through the RIC indication from the E2 node;

identifying periodically, by the processor, the non-synchronization of the RAN information between the E2 node and the one or more xAPPs;

transmitting, by the processor, an E2AP message as a RAN information request to the E2 node, when the non-synchronization of the RAN information between the E2 node and the one or more xAPPs is identified, wherein the RAN information request comprises the E2SM container with the required type of information; and receiving, by the processor, a RAN information response corresponding to the RAN information request, from the E2 node, wherein the RAN information response is transmitted by the E2 node as an E2AP response message by encoding an E2SM container with a requested RAN information.

10. The method as claimed in claim 9, wherein upon receiving the RAN information from the E2 Node, the processor executes the Near-RT RIC to resolve the data inconsistency use case scenario.

11. The method as claimed in claim 7, wherein the rapidly varying RAN information use case scenario, further comprises:

determining, by the processor, periodically, the at least one of retrieved RAN information and reported RAN information has a rapid variation within a short period, compared to previously retrieved RAN information and reported RAN information, respectively;

determining, by the processor, a complete RAN information is required by the Near-RT RIC, when the at least one of retrieved RAN information and reported RAN information has rapid variation within the short period;

transmitting, by the processor, an E2AP message a RAN information request to the E2 node, when the complete RAN information is required, wherein the RAN information request comprises the E2SM container with the required type of information; and receiving, by the processor, a RAN information response corresponding to the RAN information request, from the E2 node, wherein the RAN information response is transmitted by the E2 node as an E2AP response message by encoding an E2SM container with a requested RAN information.

12. The method as claimed in claim 7, wherein upon receiving the RAN information request by the E2 node, the method further comprises:

decoding, by the E2 node, the E2AP message and determine the E2SM container;

decoding, by the E2 node, the E2SM container to analyse the information requested;

encoding, by the E2 node, an E2SM container with the requested information within an E2AP message; and transmitting, by the E2 node, the E2AP message as the RAN information response, to the Near-RT RIC.

13. A User Equipment (UE) for retrieving Radio Access Network (RAN) information, wherein the UE comprises:

a processor; and a memory coupled to the processor, wherein the memory comprises processor-executable instructions corresponding to one or more xAPPs associated with the UE, which on execution, cause the processor to:

determine, Radio Access Network (RAN) information is required by a Near Real Time Radio access network Intelligent Controller (Near-RT RIC), based on an occurrence of at least one of non-subscription-based O-RAN use case scenarios and deployment scenarios in the Near-RT RIC, wherein the nonsubscription-based O-RAN use case scenarios and deployment scenarios comprise a data inconsistency use case scenario, a late onboarding of the one or more xAPPs deployment scenario, and a rapidly varying RAN information use case scenario, wherein for the late onboarding of the one or more xAPPs deployment scenario, the processor is further configured to:

identify a delay in the onboarding of the one or more xAPPs, by determining a lapse of pre-defined time for onboarding after start-up of the Near-RT RIC;

determine, historical RAN information is required by the one or more XAPPS;

transmit an E2AP message as a RAN information request to the E2 node, when the historical RAN information is required, wherein the RAN information request comprises the E2SM container with the required type of information; and receive a RAN information response corresponding to the RAN information request, from the E2 node, wherein the RAN information response is transmitted by the E2 node as an E2AP response message by encoding an E2SM container with a requested RAN information;

build an E2 Service Model (E2SM) container with a required type of information, when the RAN information is required;

encode the built E2SM container in an E2 Application Protocol (E2AP) message;

transmit the E2AP message as a RAN information request to an E2 node via an E2 interface associated with the O-RAN, wherein the RAN information request comprises the E2SM container with the required type of information; and receive a RAN information response corresponding to the RAN information request, from the E2 node, wherein the RAN information response is transmitted by the E2 node as an E2AP response message by encoding the E2SM container with the requested RAN information, wherein the RAN information is retrieved over the E2 interface in the O-RAN, using a RAN information request response procedure.

* * * * *